United States Patent [19]

Federowicz

[11] Patent Number: 5,424,587
[45] Date of Patent: Jun. 13, 1995

[54] INTEGRATED ELECTRICAL/COMMUNICATION SYSTEM HARDWARE

[76] Inventor: John S. Federowicz, 568 Browns Rd., Storrs, Conn. 06268

[21] Appl. No.: 941,672

[22] Filed: Sep. 8, 1992

[51] Int. Cl.⁶ .............................................. H04Q 9/00
[52] U.S. Cl. ..................... 307/140; 379/102; 379/104; 379/79; 340/310.01; 307/147
[58] Field of Search ............... 307/140, 147, 149; 340/310 A, 310 R, 310 CP, 333, 693, 531, 538; 379/171, 173, 172; 364/188, 189

[56] References Cited

U.S. PATENT DOCUMENTS

| | | | |
|---|---|---|---|
| 4,379,991 | 4/1983 | Ho et al. | 324/58.5 C |
| 4,418,333 | 11/1983 | Schwarzbach et al. | 340/310 A |
| 4,628,440 | 12/1986 | Thompson | 364/140 |
| 4,638,299 | 1/1987 | Campbell | 340/310 A |
| 4,644,320 | 2/1987 | Carr et al. | 340/310 A |
| 4,703,306 | 10/1987 | Barrit | 340/310 CP |
| 4,716,409 | 12/1987 | Hart et al. | 340/825.22 |
| 4,907,079 | 3/1990 | Turner et al. | 358/84 |
| 5,086,385 | 2/1992 | Launey et al. | 364/188 |
| 5,101,191 | 3/1992 | MacFadyen et al. | 340/310 R |
| 5,220,595 | 6/1993 | Uehara | 397/74 |

OTHER PUBLICATIONS

Graybar Catalog titled "Transmission Equipment, Section 11." Copyright 1992 by Graybar Electric Co. p. 11-7.

*Primary Examiner*—R. Skudy
*Assistant Examiner*—Aditya Krishnan
*Attorney, Agent, or Firm*—John H. Crozier

[57] ABSTRACT

In a preferred embodiment, a power module for use in an electrical system of the type having a multiplexer which provides an output signal in response to an input signal, the output signal commanding that electrical power be furnished to a device, the power module including: a housing; a first end of the housing being adapted to be inserted into an electrical outlet; a second end of the housing being adapted for electrical connection to the device, such that, when the power module is turned on, electrical power will be furnished to the device and, when the power module is turned off, electrical power will be removed from the device; and connection means to connect the power module with the multiplexer to receive the output signal from the multiplexer so that the output signal will turn the power module on and/or off. In another aspect of the invention, a power switch similar to the power module is provided. In a further aspect of the invention, a telephone modular connector is provided. In an additional aspect of the invention, a cable with a shield layer surrounding a "hot" wire and a bare ground wire is provided. In yet another aspect of the invention, a portable multiplexer access device system is provided.

15 Claims, 6 Drawing Sheets

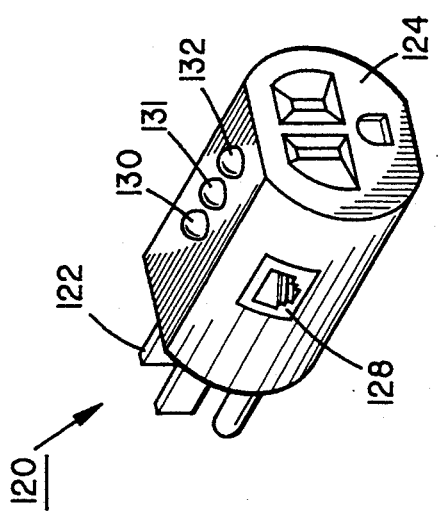
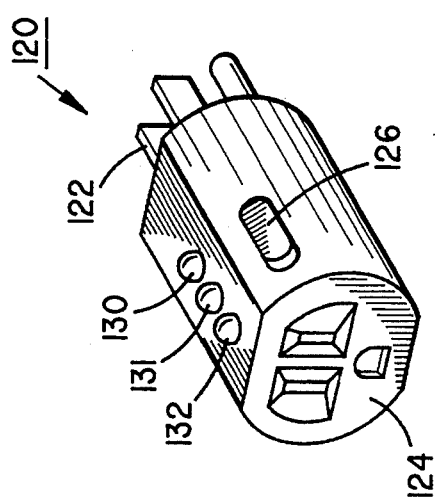
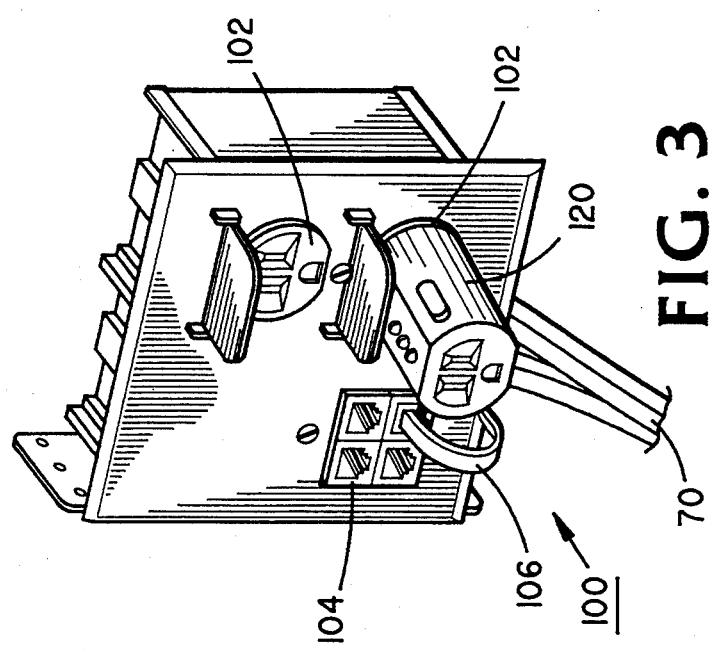
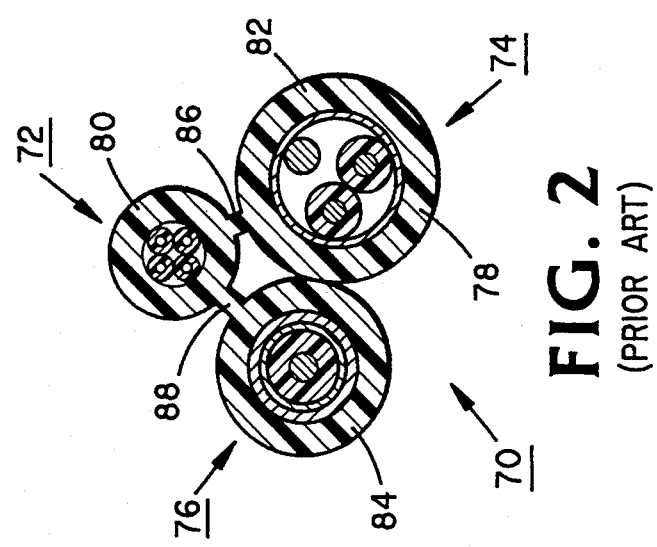

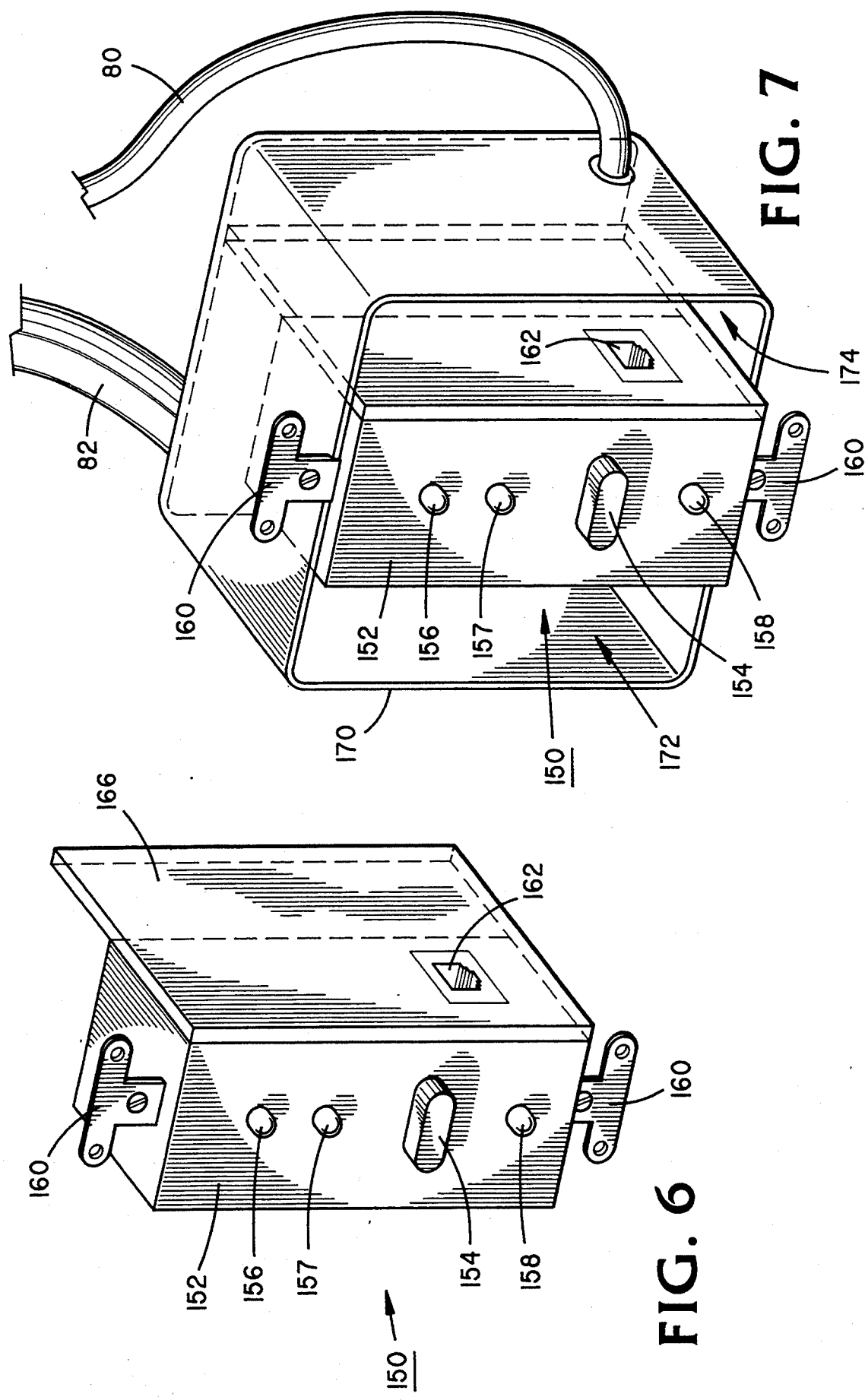

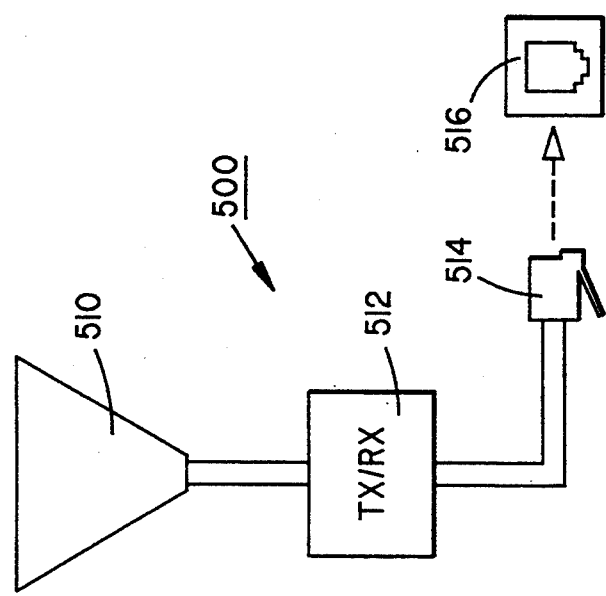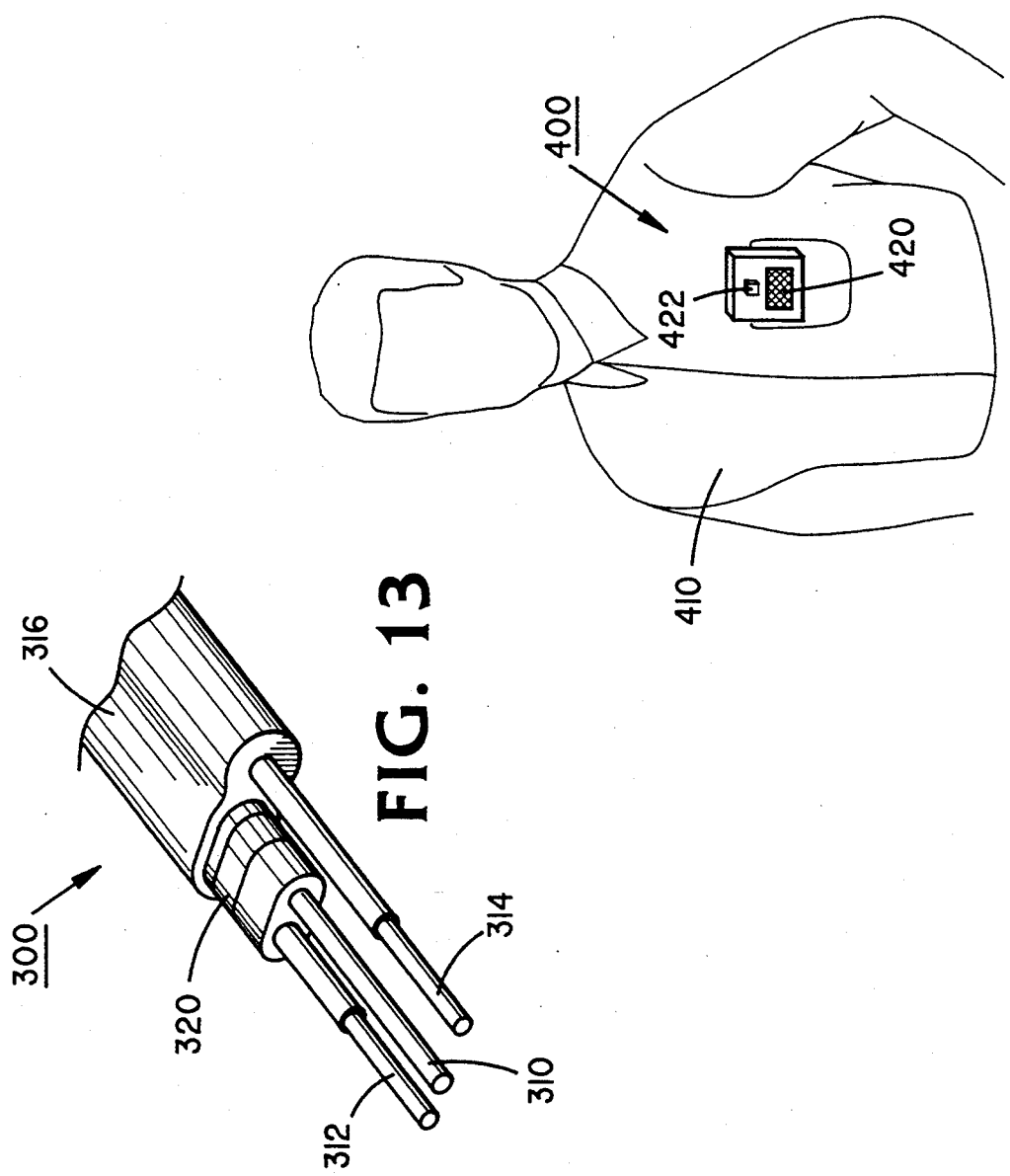

INTEGRATED ELECTRICAL/COMMUNICATION SYSTEM HARDWARE

BACKGROUND OF THE INVENTION

1. Field of the Invention

The present invention relates to electrical and communication controls systems generally and, more particularly, but not by way of limitation, to novel hardware that may be employed with integrated electrical and communication devices that may be found in a home or commercial building.

2. Background Art

Improvements in designs and manufacturing processes for electrical appliances have resulted in most homes and commercial buildings having a wide variety of electrical appliances to perform a multitude of tasks, from cooking foods to controlling heating and air conditioning equipment. Many of these tasks are time-related. For example, it is desirable that food be prepared in time for a meal and that heating equipment be activated at certain times of the year. In each case, it may be desirable that the cooking or heating equipment be activated when no one is present in the home or building. It is also desirable to be able to activate, for example, lighting, heating, or cooking equipment from a remote location within the home or building. Some systems are available for providing such remote control, usually involving dedicated wiring or radio frequency control.

Additional wired systems in homes and commercial buildings are dedicated to telephones, the numbers of which have multiplied greatly, due, at least in part, to the deregulation of the telephone industry which has led to low cost telephones and user or contractor installed telephone wiring. Other uses requiring wiring in homes and commercial buildings are cable television and data services (CATV/DATA) and local computer networks.

Recently, there have been a great deal of discussion and proposals for developing "smart buildings" in which the whole of the electrical and communication system is integrated into a single control system. Heretofore, however, there has not been developed an integrated hardware system to facilitate the installation and use of such a control system.

Accordingly, it is a principal object of the present invention to provide hardware for an integrated electrical/communication system to facilitate the installation and use thereof.

It is a further object of the invention to provide such hardware that is economical to manufacture.

It is an additional object of the invention to provide such hardware that is easily installed and used.

It is another object of the invention to provide such hardware that is safe and affords a neat installation.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among other, by providing, in a preferred embodiment, a power module for use in an electrical system of the type having a multiplexer which provides an output signal in response to an input signal, said output signal commanding that electrical power be furnished to a device, said power module comprising: a housing; a first end of said housing being adapted to be inserted into an electrical outlet; a second end of said housing being adapted for electrical connection to said device, such that, when said power module is turned on, electrical power will be furnished to said device and, when said power module is turned off, electrical power will be removed from said device; and connection means to connect said power module with said multiplexer to receive said output signal from said multiplexer so that said output signal will turn said power module on and/or off. In another aspect of the invention, a power switch similar to the power module is provided. In a further aspect of the invention, a telephone modular connector is provided. In an additional aspect of the invention, a cable with a shield layer surrounding a "hot" wire and a bare ground wire is provided. In yet another aspect of the invention, a portable multiplexer access device system is provided.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 2 is a multiconductor cable useful in the system of FIG. 1.

FIG. 3 is a wall outlet for use with the cable of FIG. 2.

FIGS. 4 and 5 are perspective views of a power module for use in the system of FIG. 1.

FIG. 6 is a perspective view of a switch module for use in the system of FIG. 1.

FIG. 7 is a perspective view of the switch module of FIG. 6 installed in a wall box.

FIG. 13 is a perspective view of a shielded cable useful in the system of FIG. 1.

FIG. 14 is a perspective view of a person wearing a portable access device for communication with the system of FIG. 1.

FIG. 15 is a schematic diagram illustrating the means of communication of the portable access device of FIG. 14 with the system of FIG. 1.

DETAILED DESCRIPTION OF THE PREFERRED EMBODIMENTS

Figure 1:
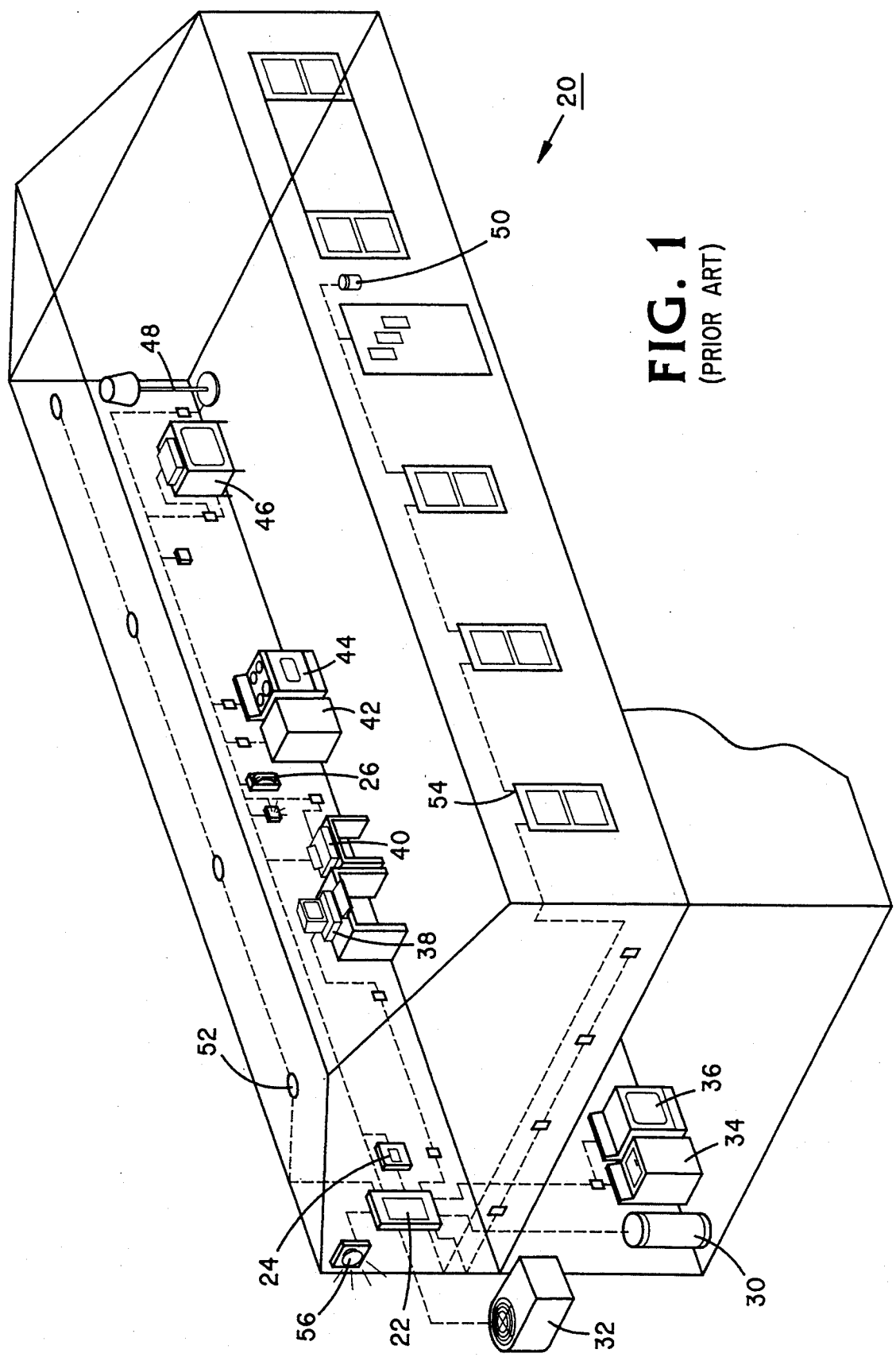
FIG. 1 is a partially phantom perspective view of a "smart house" with an electrical/communication control system installed therein.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates some of the features that may be included in a "smart house," the house being indicated generally by the reference numeral 20. At the heart of smart house 20 is a circuit breaker panel 22 to which is connected a voice actuated multiplexer 24. Multiplexer 24 is connected, for example, to telephone 26 to receive voice commands therefrom. Multiplexer 24 may also receive commands from telephones located outside of house 20. Upon receiving a voice command, multiplexer 24 turns on or turns off, or otherwise activates or deactivates or receives inputs from, items to which it is coupled. Such items may include, for example, a heater 30, an air conditioner 32, a washer 34, a dryer 36, a computer 38, a facsimile machine 40, a freezer 42, a range 44, a TV 46, a lamp 48, an outside light 50, smoke detectors, as at 52, window switches, as at 54, and/or fire/burglar alarm 56.

In use, for example, a homeowner (not shown) may pick up telephone 26 press the "#" button to activate voice actuated multiplexer 24. Then the homeowner gives the voice command "Outside lights on." Multiplexer 24 recognizes the command and causes the outside light 50 to be lighted. If circuitry is included to provide feedback to multiplexer 24 that the outside lights are on, the multiplexer will engage a tape recorder to return to the homeowner the answer "Lights on."

Computer 38, facsimile machine 40, and TV 46 may also be coupled to one or more CATV/DATA services.

It will be understood that such a system requires that power, telephone, and command wiring (not shown separately on FIG. 1) be installed in house 20. This can be a relatively complicated and expensive procedure, particularly if the system is being retrofitted to an existing structure. Having several different wiring systems also results in less than a neat installation.

In order to simplify the installation of the above wiring systems, there has been developed a cable which combines power supply, coaxial cable, telephone, and additional wiring. Such a cable is marketed under the trademark "Tri/Con" and is described in U.S. Pat. No. 4,533,790, issued Aug. 6, 1985, to Johnston et al., and titled ELECTRICAL CONDUCTOR ASSEMBLY, the disclosure of which is incorporated by reference hereinto. The use of this cable brings all services to a single point with but one cable to pull.

FIG. 2 illustrates a Tri/Con cable, generally indicated by the reference numeral 70. Cable 70 includes three groups of electrical conductors, generally indicated by the reference numerals 72, 74, and 76 which are separated from each other and insulated by a unitary dielectric insulation jacket 78. Insulation jacket 78 is preferably made from an elastomeric material and has three distinct free-stripping tubular portions each having a generally circular cross section. A first portion 80 of jacket 78 generally coaxially surrounds the electrical conductors which comprise the first group of conductors 72. These conductors are particularly adapted to supply telephone service. A second portion 82 of jacket 78 generally coaxially surrounds the conductors of the second group 74, which constitute power supply conductors. A third portion 84 of jacket 78 surrounds the third group of conductors 76, which comprise a coaxial cable arrangement for CATV/DATA service.

Jacket second portion 82 is connected to jacket first portion 80 along its length by an integral longitudinally extending web 86. A similar web 88 connects jacket first portion 80 with jacket third portion 84.

It will be understood that Tri/Con cable contains all of the conductors required for smart house 20 (FIG. 1) and that, through use of the Tri/Con cable, all are installed together in a single installation procedure to all points in the house. Cable portions 80, 82, and 84 are easily separated by breaking webs 86 and 88 at the ends of cable 70.

FIG. 3 illustrates a wall outlet unit, generally indicated by the reference numeral 100, especially useful for use with Tri/Con cable, and also marketed under the trademark Tri/Con. Outlet 100 includes conventional three-prong receptacles 102 and four modular receptacles 104 for connection thereto of telephone or CATV/DATA equipment (neither shown) and/or of a power module 120 which is shown inserted in one of receptacles 102.

FIGS. 4 and 5 illustrate a power module which may be used with Tri/Con outlet unit 100 (FIG. 3), the power module being generally indicated by the reference numeral 120. Power module 120 includes conventional prongs, as at 122, for insertion into a receptacle 102 of outlet 100 (FIG. 3) and a conventional three-prong receptacle at a second end 124 thereof for insertion thereinto of the power cord (not shown) of an appliance or other electrical device to receive electrical power. Power module 120 includes a manual on/off switch 126 at one side thereof and a modular receptacle 128 on the other side thereof. On top of power module 120 are three LEDs.

In use, power module 120 is plugged into a receptacle 102 in Tri/Con outlet 100 (FIG. 3) and modular receptacle 128 on the power module is coupled to a modular receptacle 104 on the outlet by means of a short length of telephone cable 106. The latter connection puts power module 120 in communication with voice actuated multiplexer 24 (FIG. 1). Now, assuming that lamp 48 (FIG. 1) is plugged into power module 120 and the homeowner wishes to have the lamp lighted, the homeowner would command multiplexer 24 to light the lamp, the multiplexer would send a signal through the data connection to switch on power module 120, and the lamp would be lighted. Once power is supplied to lamp 48, power module 120 would return a confirming signal to multiplexer 124. Should the homeowner be in the vicinity of power module 120, he may simply light lamp 48 by means of manual switch 126 on the power module.

LEDs 130–132 are provided to indicate status. For example, LED 130 may be blue to show that the multiplexer is operating the appliance or that the appliance has been programmed by the multiplexer, LED 131 may be red to indicate the unit is off, and LED may be green to indicate manual operation mode. Alternatively, a two-colored LED (not shown) may be employed, with green indicating manual operation, blue indicating that multiplexer 24 (FIG. 1) is on, and the absence of color indicating that the unit is off.

FIGS. 6 and 7 illustrate a switch module, generally indicated by the reference numeral 150 for use with the system of FIG. 1 and which may be used with Tri/Con cable 70 (FIG. 2). Switch module 150 includes a housing 152 through the face of which are disposed a manual switch 154 and LEDs 156, 157, and 158, the latter four elements having the same functions as the similar elements on power module 120 (FIGS. 4 and 5). Switch module 150 includes two conventional mounting flanges 160 disposed at the top and bottom thereof and a modular receptacle 162 in one side 166 thereof. Side 166 continues rearwardly of housing 152. When installed in a single gang outlet box 170 (FIG. 7) side 166 serves as a barrier to divide the box into two separated cavities 172 and 174 high voltage and low voltage cavities, respectively.

Thus arranged, portion 82 of Tri/Con cable 70 (FIG. 2), containing power wiring, may be brought into high voltage cavity 172 in outlet box 170 and connected (not shown) to the side of switch module 150 in that cavity. Similarly, the power connection (not shown) to whatever equipment switch module 150 is to supply power will be made in high voltage cavity 172. Portion 80 of cable 70 will be brought into low voltage cavity 174, a modular jack (not shown) attached to the end of the communication wires in portion 80, and the jack plugged into receptacle 162. It can be seen that the configuration of switch module completely separates the high and low voltage connections thereto.

The operation of switch module 150 is essentially the same as that described for power module 120 (FIGS. 4 and 5).

Figure 9:
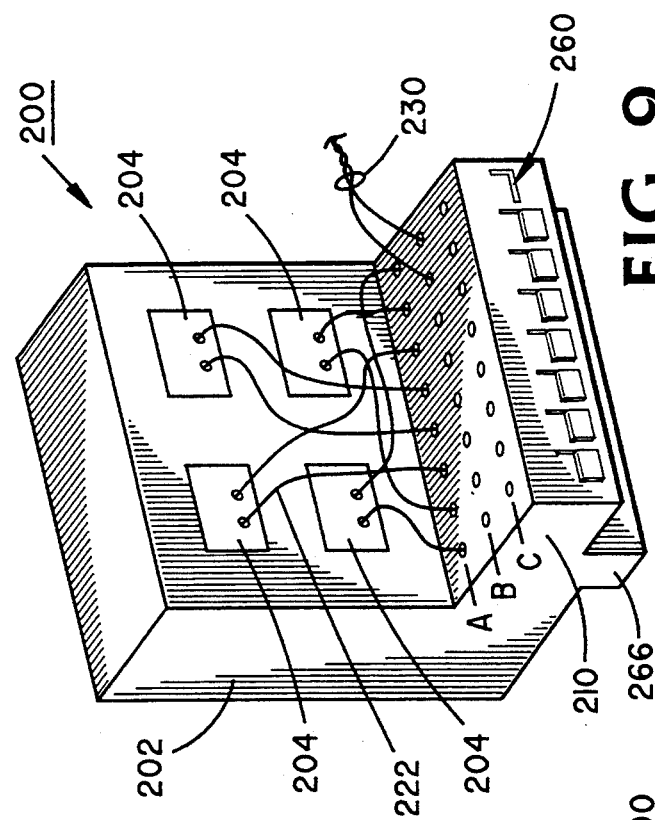
FIG. 9 is a rear perspective view of the telephone modular jack of FIG. 7.
Figure 8:
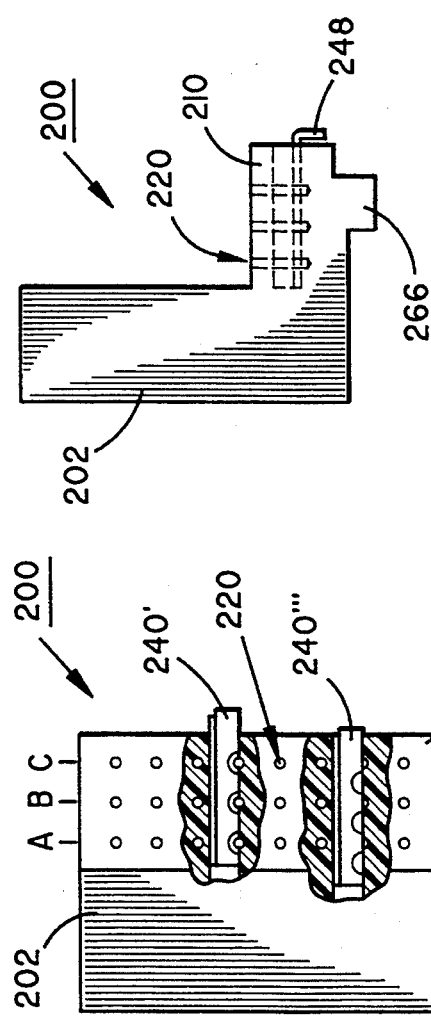
FIG. 8 is a front perspective view of a telephone modular jack for use in the system of FIG. 1.
Figure 11:
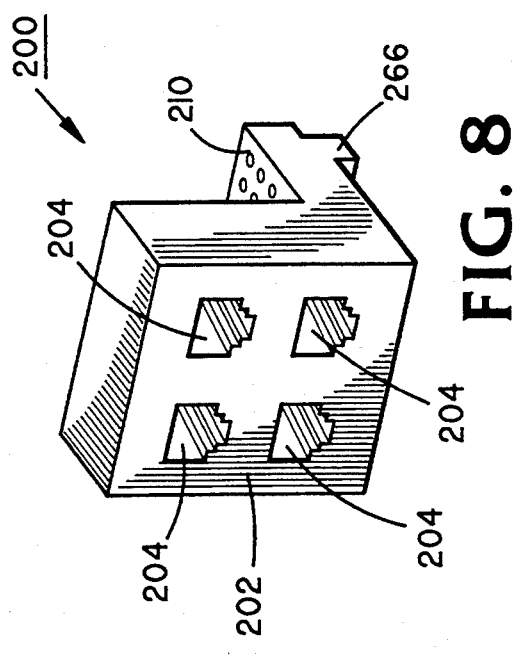
FIG. 11 is a top plan view, partially cut-away of the telephone modular jack of FIG. 8 showing the use of splicing tabs.

FIGS. 8–12 illustrate a telephone modular connector, generally indicated by the reference numeral 200, which is useful in separating and reconfiguring the twisted pairs of communication wires in portion 80 of Tri/Con cable 70 (FIG. 2) and which may be employed in the system of FIG. 1. Modular connector 200 includes a vertical modular receptacle portion 202 (FIG. 8) in which are disposed four modular receptacles 204 (FIG. 8). Integral with receptacle portion 202 and extending horizontally therefrom is a splicing board 210 (FIG. 9). Defined in splicing board 210 are a plurality of vertical channels (FIG. 11), as at 220, arranged in three rows indicated by the letters A, B, and C. Each of the eight vertical channels 220 in row A have inserted therein one ends of leads (FIG. 9), as at 222, the other ends of which are connected to modular receptacles 204. The wires 230 of a twisted wire pair from portion 80 of Tri/Con cable (FIG. 2) are inserted in two channels 220 in row B (FIG. 9). Other such wires (not shown) would similarly be inserted in the other channels 220 in row B and, if desired, wires from additional twisted wire pairs may also be inserted in channels 220 in row C.

Figure 10:
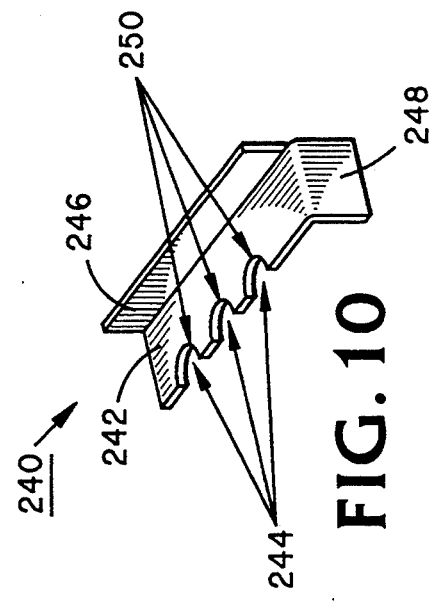
FIG. 10 is an enlarged perspective view of a splicing tab for use with the telephone modular jack of FIG. 8.
Figure 12:
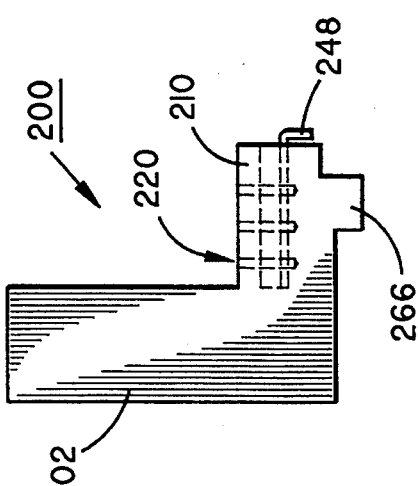
FIG. 12 is a side elevational view of the telephone modular jack of FIG. 8.

In order to connect wires 230 with wires 222, there is provided a plurality of splicing tabs, such as a splicing tab, generally indicated by the reference numeral 240, on FIG. 10. Splicing tab 240 includes a horizontal member 242 having formed therein at one edge thereof three semicircular openings 244. Along the opposite edge of horizontal member 242 is a vertical guide member 246 and attached to one end of the horizontal member is a vertical tab 248. The edges of openings 244 closest tab 248 comprise flat cutting edges 250.

In use, splicing tabs 240 are inserted in L-shaped openings, as at 260 (FIG. 9). As splicing tabs 240 are inserted, such as splicing tab 240' on FIG. 11, cutting edges 250 will cut through the insulation on any wires 222 and 230 inserted in channels 220 which the splicing tab passes and, when the splicing tab is fully inserted, such as splicing tab 240" on FIG. 11, the splicing tab will electrically connect any such wires. Splicing tab 240 may be inserted with the aid of a pair of pliers (not shown) placed with its jaws against the outer surface of tab 248 and the inner surface of a downwardly extending flange 266 (FIG. 9) formed along the distal edge of splicing board 210. Splicing tabs 240 may be removed by inserting a screwdriver between the inner surface of tab 248 and the outer surface of flange 266.

Thus, telephone modular connector 200 and splicing tabs 240 may be arranged to connect wires 230 to modular receptacles 204 in any desired pattern. It will be understood that the particular arrangement shown for telephone modular connector 200 is for illustrative purposes only and that the telephone modular connector may have any desired number of modular receptacles 204 and may have any desired number of channels 220 to accommodate any number of wires 230.

FIG. 13 illustrates a three-wire cable, generally indicated by the reference numeral 300, which is useful in the system illustrated on FIG. 1. Cable 300 includes a bare ground wire 310, an insulated "hot" (black) wire 312, and an insulated "common" (white) wire 314, all encased in a common insulation member 316. Thus far, all elements described are conventional in a three-wire cable. However, according to the present invention, there is provided a metallic shield layer 320 disposed about hot wire 312 and bare ground wire 310 and directly in contact with the latter. This arrangement has two important advantages. First, shield layer 320 eliminates low-level radiation and cross-talk, a feature which is important in digital communications. Second, prior to the combustion of any portion of cable 300, the shorting of current from hot wire 312 to bare ground wire 310 through shield layer 320 will cause the circuit of which the cable is a part to fault, thus preventing the fire which could otherwise occur.

FIG. 14 illustrates a portable access device (PAD), generally indicated by the reference numeral 400, which may be clipped to the clothing of a user 410, and which is employed to access the system of FIG. 1. PAD 400 comprises a single channel transceiver with rechargeable battery (not shown) and includes a speaker/microphone 420 and an activation button 422. PAD is intended for use with the circuitry schematically illustrated on FIG. 15 and designated by the general reference numeral 500. Circuitry 500 includes an antenna 510, coupled to a transmitter/receiver 512 to which is connected a modular connector 514 for insertion in a designated modular receptacle 516.

In use, activation button 422 (FIG. 14) is depressed, thus engaging voice activated multiplexer 24 (FIG. 1) through circuitry 500 (FIG. 15). Then, user 410 gives a voice command as was described above with reference to FIG. 1, multiplexer 24 interprets and carries out the command, reports the status through PAD 400, and powers down the PAD. This permits user 410 a great deal of physical freedom, while allowing the user to have full access to the capabilities of the system of FIG. 1.

Figure 16:
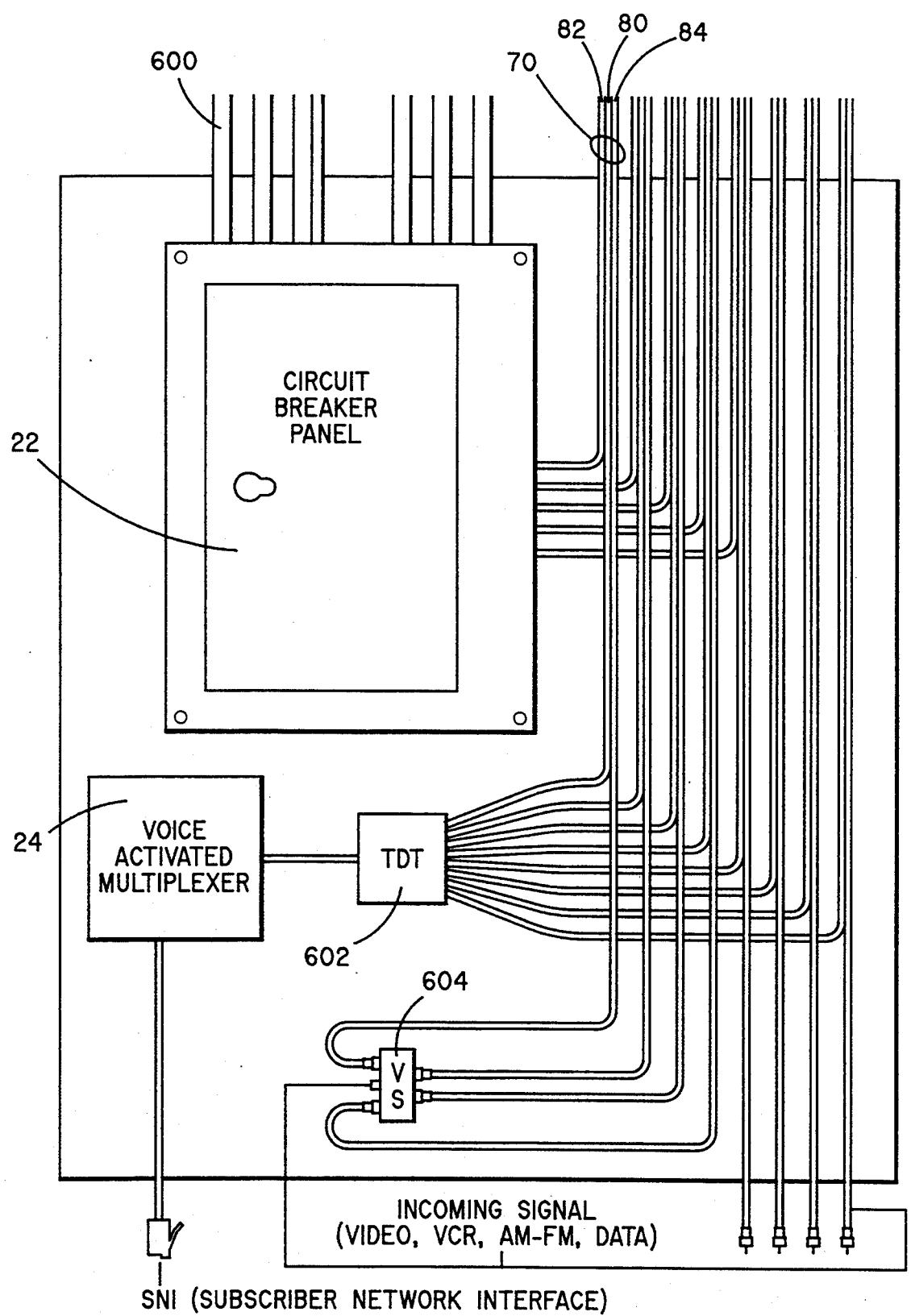
FIG. 16 is a front elevational view of a circuit breaker panel installation for the system of FIG. 1.

FIG. 16 illustrates the combining of power, telephone, and CATV/DATA into Tri/Con cables 70. Circuit breaker panel 22 has connected thereto a plurality of incoming power lines, as at 600. An exemplary cable 70 has had portions 80, 82, and 84 of the end thereof separated so that portion 82 may be connected to circuit breaker panel 22, portion 80 may be connected to a telephone distribution terminal 602, and portion 84 may be connected to video splitter 604. As noted above, all these functions are now present in a single cable which can be quickly, easily, and neatly run through a new or existing structure.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An electrical system for automatically furnishing electrical power to a device, comprising:
    (a) a multiplexer to receive a voice command over a telephone line connected thereto and to provide an output control signal in response to said voice command, said output signal commanding that electrical power be furnished to a device;
    (b) a power module housing having therein a power module;
    (c) a first end of said power module housing being insertable into an electrical outlet;
    (d) a second end of said power module housing being electrically connectable to said device, such that, when said power module is turned on, electrical power will be furnished to said device and, when said power module is turned off, electrical power will be-removed from said device; and
    (e) non-power-wiring connection means to connect said power module with said multiplexer to receive said output signal from said multiplexer so that said output signal will selectively turn said power module on and/or off.

2. An electrical system, as defined in claim 1, further comprising means to manually activate said power module.

3. An electrical system, as defined in claim 1, further comprising a first indicator light indicating when said power module is under multiplexer control.

4. An electrical system, as defined in claim 3, further comprising a second indicator light indicating when said power module is under manual control.

5. An electrical system, as defined in claim 4, further comprising a third indicator light indicating when said power module is off.

6. An electrical system, as defined in claim 1, wherein said electrical outlet is mounted in a wall outlet box and said output signal from said multiplexer is carried by non-power wiring to said wall outlet box where said power module is connected to said wiring.

7. An electrical system, as defined in claim 6, wherein said non-power wiring and said electrical power to which said power module is connected are carried to said wall outlet box in a composite cable assembly.

8. An electrical system for automatically furnishing electrical power to a device, comprising:
    (a) a multiplexer to receive a voice command over a telephone line connected thereto and to provide an output control signal in response to said voice command, said output signal commanding that electrical power be furnished to a device;
    (b) a switch module housing having therein a switch module;
    (c) said switch module housing being mountable in a wall outlet box;
    (d) said switch module housing being connectable to electrical power wiring and for electrical connection to said device, such that, when said switch module is turned on, electrical power will be furnished to said device and, when said switch module is turned off, electrical power will be removed from said device; and
    (e) non-power-wiring connection means to connect said switch module with said multiplexer to receive said output signal from said multiplexer so that said output signal will turn said switch module on and/or off.

9. An electrical system, as defined in claim 8, further comprising means to manually activate said switch module.

10. An electrical system, as defined in claim 8, further comprising a first indicator light indicating when said switch module is under multiplexer control.

11. An electrical system, as defined in claim 10, further comprising a second indicator light indicating when said switch module is under manual control.

12. An electrical system, as defined in claim 11, further comprising a third indicator light indicating when said switch module is off.

13. An electrical system, as defined in claim 8, wherein said output signal from said multiplexer is carried by said non-power wiring to said wall outlet box where said switch module is connected to said wiring.

14. An electrical system, as defined in claim 13, wherein a wall portion of said housing extends rearwardly of said housing such that, when said housing is inserted in said wall outlet box, said wall portion will extend to the rear of said wall outlet box, thus partitioning said wall outlet box from front to rear into first and second side-by-side compartments, so that connections to low voltage signal wiring can be made in said first compartment, said switch module is disposed in said second compartment, and connections to said electrical power wiring are made in said second compartment.

15. An electrical system, as defined in claim 8, wherein said wiring and said electrical power to which said switch module is connected are carried to said wall outlet box in a composite cable assembly.

* * * * *